Feb. 10, 1942. H. C. HILL 2,272,172
CONNECTING ROD
Original Filed April 9, 1938
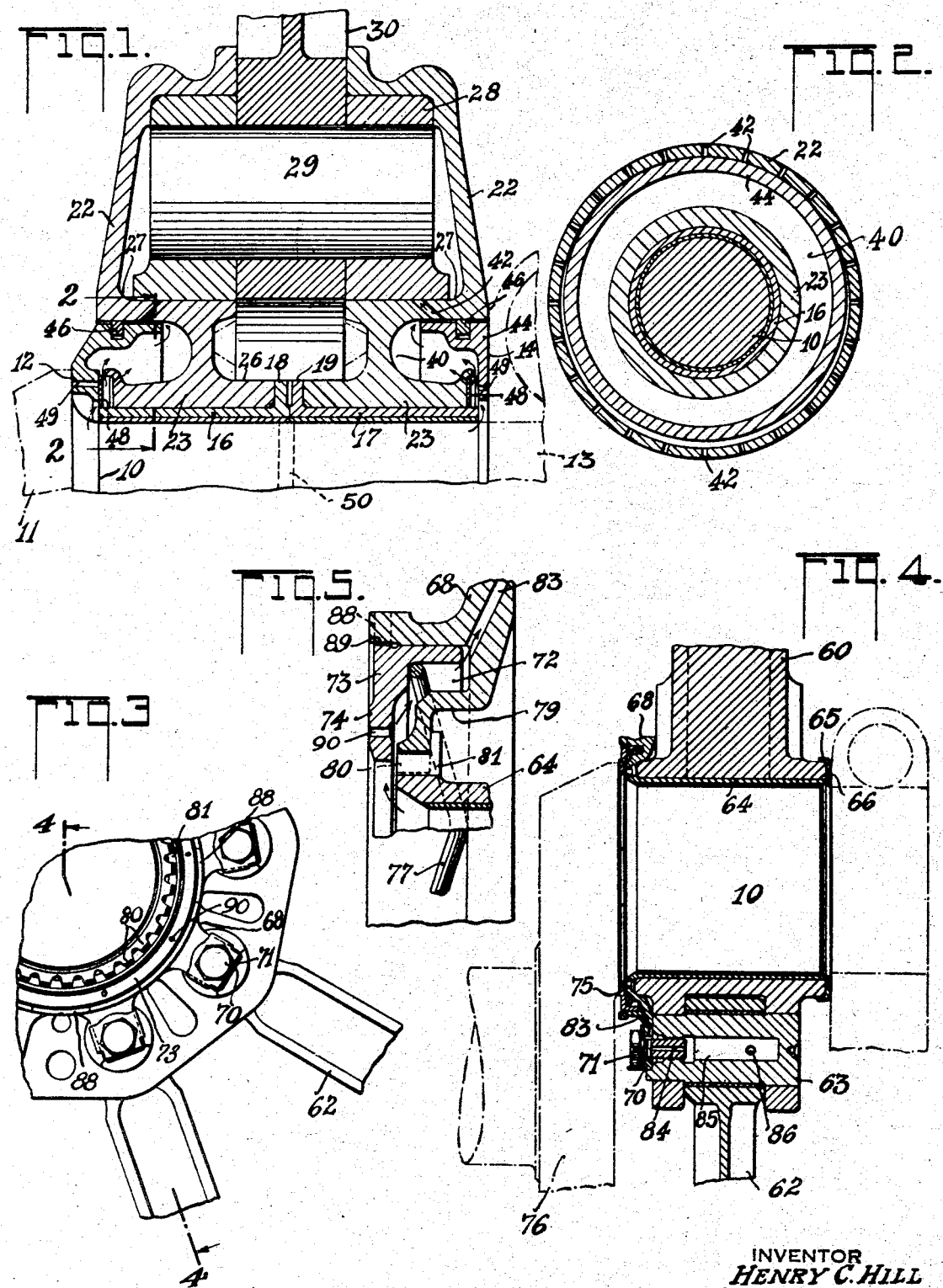
INVENTOR
HENRY C. HILL
BY
ATTORNEY Patented Feb. 10, 1942

2,272,172

UNITED STATES PATENT OFFICE 2,272,172

CONNECTING ROD

Henry C. Hill, Montclair, N. J., assignor to Wright Aeronautical Corporation, a corporation of New York Original application April 9, 1938, Serial No. 201,093, now Patent No. 2,239,039, dated April 22, 1941. Divided and this application September 2, 1939, Serial No. 293,241

18 Claims. (Cl. 308—36.1)

This invention relates to connecting rods for radial cylinder engines, comprising improvements in means for sealing and lubricating the bearings of radial cylinder engine connecting rods.

An object is to provide means for lubricating a rod system comprising a plurality of individually movable connecting rods mounted in an annular bearing member which in itself is rotatable upon a crankpin, the lubricating provisions including means to prevent excessive bleed of oil fed from a crankpin bearing.

Another object of the invention is to provide end seals in a connecting rod bearing to prevent undue loss by oil bleed therefrom, and to utilize these end seals in connection with the lubrication of individual connecting rods articulated in the bearing member.

Further objects will be apparent in reading the annexed detailed description in connection with the drawing, in which:

Fig. 1 is an axial section through part of the connecting rod system.

Fig. 2 is a section on the line 2—2 of Fig. 1;

Fig. 3 is an end view of a rod system showing an alternative means for bearing locking and lubricating;

Fig. 4 is an axial section on the line 4—4 of Fig. 3; and

Fig. 5 is an enlarged fragmentary section of a portion of Fig. 4.

Referring to the drawing, the crankpin of a crankshaft is indicated at 10, this having a left hand crankcheek 11 provided with a sealing face 12 and a clamped cheek 13 provided with a sealing face 14. On the crankpin, in bearing engagement therewith, are bearing halves 16 and 17 having, respectively, central abutting flanges 18 and 19. The bearings 16 and 17 are embraced by opposed similar track members 22, each of which includes a bearing housing 23. The housings 23 and the bearings 16 and 17 are all locked together from relative rotation.

The members 22, when assembled, comprise an inner circumferential track 26 and opposed, facing grooves 27 forming raceways. Within the latter are disposed segmental bearing blocks 28 bearing on the inner and outer groove faces, the blocks 28 being provided with bores to receive a crosspin 29 upon which is mounted a connecting rod 30. The pin 29 may either be integral with the rod 30 or may be loosely fitted thereto, and it will be seen that operating pressures upon each rod 30 are transmitted through the pin 29 and the blocks 28 to the groove faces of the bearing members 22. The inner end of each connecting rod 30 is stabilized against tipping by means, not shown, engaging the track 26.

To provide for adequate lubrication of the rod system, each bearing member 22 is provided with an annular end cavity 40, the outer wall of which is drilled as at 42 at a plurality of circumferentially spaced points to permit of oil feed from the cavity 40 to the block groove 27 for lubrication of the blocks. Within the cavity 40 is disposed a sealing ring 44 of smaller diameter than the outer wall of the cavity 40, this ring being provided with a split ring 46 seated in a groove therein and bearing upon the wall of the cavity 40. A waved spring 48 between the end of the housing portion 23 and an inward projection of the ring 44 urges the latter outwardly into end sealing engagement with the crankcheek faces 12 and 14, and oil, bleeding from the space between the crankpin 10 and the bearings 16 and 17 passes into the cavity 40, lubricating the end seals through holes 49 and passing through certain of the holes 42 for lubrication of the blocks 28. By the loose fit of the ring 44 in the member 22, it will tend to be thrown radially outward from the crankpin by centrifugal force, thus closing off the outermost holes 42 to prevent the passage of oil therethrough, but opening the innermost holes 42 for the passage of lubricant. Since centrifugal force will build a substantial pressure at the outermost portions of the cavity 40, this eccentric sealing arrangement prevents undue bleeding of oil from the cavity while permitting of oil flow to the bearing members 22 at the radially inward parts thereof where the centrifugal force is relatively low. It is to be understood that the crankpin 10, according to conventional practice, is hollow to provide an oil manifold, and that a drilling such as 50 in the crankpin provides for the flow of oil to the crankpin bearing. The ring 46 remains in contact with the wall of the cavity 40 to seal the ring 44, outboard of the holes 42, regardless of the eccentric position of the ring 44 relative to the bearing member.

In Figs. 3, 4 and 5 I show an oil seal organization comparable to that above described, but applied to a conventional connecting rod assembly utilizing a master rod 60, and auxiliary rods 62 articulated thereto on knuckle pins 63. In this case, the master rod 60 carries a crankpin bearing 64 bearing upon the crankpin 10. One end face of the master rod is provided with an end seal element 65 bearing against a co-acting sealing face on a crankcheek 66, this end seal preventing undue bleed of lubricant from that end of the bearing 64 during operation. The opposite end of the rod 60 is provided with an annular member 68 having radial extensions 70 engaging, through screws 71, the ends of the knuckle pins 63, the annular member 68 providing means for locking the knuckle pins in assembled relation in the rod 60. As shown in Fig. 5, the member 68 is provided with an end annular cavity 72 within which is seated an end seal annulus 73 adapted to slide axially relatively to the member 68 and to bear at its face 74 upon a co-acting face 75 on the crankcheek 76. The annulus 73 is constrained against rotation in the member 68 by lugs 88 on the annulus engaging notches 89 in the member. The face 74 has oil holes 90 for lubrication of the face from oil in the cavity 72. A waved spring 77, interposed between the annuli 68 and 73, urges the latter annulus into sealing engagement with the crankcheek 76, preventing undue leakage of oil from the left end, as shown, of the crankpin bearing 64. Pressure exerted by the spring 77 reacts between the annulus 73 and the connecting rod 60, to assure end sealing contact between the seal 65 and the right hand crankcheek.

The annulus 68 has an inward annular extension 79 having teeth 80 engaging corresponding teeth 81 formed on the end of the bearing 64, whereby the bearing 64 is locked from rotation relative to the connecting rod 60 since the annulus 68 is firmly attached to the connecting rod.

The extensions 70 from the annulus 68 are provided with radial drillings 83 leading from the cavity 72 to the knuckle pins, so that that oil which accumulates in the cavity 72, as well as lubricating the end seal 74, passes to the knuckle pins for the lubrication thereof through drillings 84, 85 and 86 in the knuckle pin assembly.

It will be appreciated that the lubricating provisions for the rod embodiments of Figs. 1 and 2, on the one hand, and Figs. 3 to 5, on the other hand, have many features in common, and may generally be considered as a generic form of lubricating system for radial connecting rod arrangements of virtually any type.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

This application is a division of application Serial No. 201,093, filed April 9, 1938, now Patent No. 2,239,039.

I claim as my invention:

1. In a radial engine connecting rod system, a shaft having a crankpin, a bearing member journalled thereon and having an annular cavity therein, said member having a plurality of circumferentially spaced substantially radial oil holes leading from the cavity toward the outside of the member, means for feeding oil to said cavity, and a loosely fitted ring in said cavity positioned to bear upon part of the outer wall of the cavity and to seal the oil holes adjacent to its contact with the wall, said ring, during crankpin rotation, being thrown radially outward by centrifugal force against that part of the cavity wall most remote from the shaft center.

2. In a radial connecting rod system, a shaft having a crankpin and a crankcheek, a bearing member on the crankpin having an annular cavity opening toward the crankcheek, said member having a plurality of circumferentially spaced holes communicating with the cavity, means to supply lubricant to the cavity, and a loosely fitted seal ring bearing upon a portion of the cavity wall to close off some of said holes, said ring bearing on the crankcheek to seal said cavity from end leakage of the lubricant.

3. In a radial connecting rod system, a shaft having a crankpin including a crankcheek, a bearing member on the crankpin having an annular cavity opening toward the crankcheek, said member having a plurality of circumferentially spaced holes communicating with the cavity, means to supply lubricant to the cavity, a loosely fitted seal ring bearing upon a portion of the cavity wall to close off some of said holes, said ring bearing on the crankcheek to seal said cavity from end leagage of the lubricant, and a split sealing ring carried by the first ring for sealing engagement with the entire circumference of the cavity wall between the crankcheek and the holes in said member.

4. In a connecting rod big-end bearing journalled on a crankpin having plane crankcheeks at the bearing ends, annuli disposed between the bearing ends and respective crankcheeks having sealing engagement with both, means for lubricating the bearing centrally thereof, and means incorporated in said sealing annuli to utilize bearing oil bleed for lubricating the sealing faces thereof.

5. In a crankshaft and connecting rod system comprising a crankpin and a rod member journaled thereon, said member having an annular passage and oil holes opening to the outer parts of the passage, an annulus loosely fitted in the passage adapted to fling against the outer parts of the annular passage, during shaft rotation, to close off certain of said oil holes.

6. In a crankshaft and connecting rod system comprising a crankpin and a rod member journaled thereon, said member having an annular recess toward an end which includes a cylindrical wall having a plurality of coplanar openings, an annulus loosely fitted within the recess for eccentric movement relative to the crankpin and for engagement with the part of the wall most remote from the shaft center under the influence of centrifugal force to seal off the outermost openings in said wall.

7. In a crankshaft and connecting rod system comprising a crankpin and a rod member journaled thereon, said member having an annular recess toward an end which includes a cylindrical wall, an annulus loosely fitted within the recess for eccentric movement relative to the crankpin and for engagement with the part of the wall most remote from the shaft center under the influence of centrifugal force, said member having circumferentially spaced holes opening through the wall certain of which are closed off by said annulus.

8. In a crankshaft and connecting rod system comprising a crankpin and a rod member journaled thereon, said member having an annular recess toward an end which includes a cylindrical wall having a plurality coplanar walls, an annulus loosely fitted within the recess for eccentric movement relative to the crankpin and for engagement with the part of the wall most remote from the shaft center under the influence of centrifugal force to seal off the outermost openings in said wall, said annulus having a groove, and a split ring in said groove in sealing engagement with said wall throughout its periphery.

9. In a crankshaft and connecting rod system comprising a crankpin and a rod member journaled thereon, said member having an annular recess toward an end which includes a cylindrical wall, an annulus loosely fitted within the recess for eccentric movement relative to the crankpin and for engagement with the part of the wall most remote from the shaft center under the influence of centrifugal force, said member having circumferentially spaced holes opening through the wall certain of which are closed off by said annulus, and means to seal said annulus with respect to the wall throughout the periphery of both, in a plane axially removed from said holes.

10. In a connecting rod bearing lubrication system, a crankpin journal from which lubricant is fed to the surface thereof, said journal having a substantially plane end face, a connecting rod member having a bearing fitted thereto, the bearing being journalled on the pin, an end member secured to the rod member and engaging the bearing to secure the latter against rotation in the rod member, said end member having a cylindrical recess, and an annular piston engaged in said cylindrical recess in sealing relation, said piston being axially movable relative to the rod and end members and having an end face engaged in sealing relationship with said crankpin journal end face, said piston being pressed into said end face sealing engagement by lubricant pressure resulting from bearing end leakage.

11. In a connecting rod bearing lubrication system, a crankpin journal from which lubricant is fed to the surface thereof, said journal having a substantially plane end face, a connecting rod element having a bearing engaging the journal, a member rigid with the element having a cylindrical recess at an end thereof, and an annular piston slidably engaged in said cylindrical recess in oil sealing relation, said piston having an end face engaged in sealing relationship with the end face of said journal, said piston being pressed into said end face sealing engagement by lubricant pressure resulting from end leakage of lubricant from the bearing into said cylindrical recess.

12. In a connecting rod bearing lubrication system, a crankpin journal from which lubricant is fed to the surface thereof, said journal having a substantially plane end face, a connecting rod element having a bearing engaging the journal, a member rigid with the element having a cylindrical recess at an end thereof, and an annular piston slidably engaged in said cylindrical recess in oil sealing relation, said piston having an end face engaged in sealing relationship with the end face of said journal, said piston being pressed into said end face sealing engagement by lubricant pressure resulting from end leakage of lubricant from the bearing into said cylindrical recess, said piston having circumferentially spaced lubricant holes between its end sealing face and its inner wall.

13. In a connecting rod bearing lubrication system, a crankpin journal from which lubricant is fed to the surface thereof, said journal having a substantially plane end face, a connecting rod element having a bearing engaging the journal, a member rigid with the element having a cylindrical recess at an end thereof, and an annular piston slidably engaged in said cylindrical recess, said piston having an end face engaged in sealing relationship with the end face of said journal, said piston being pressed into said end face sealing engagement by lubricant pressure resulting from end leakage of lubricant from the bearing into said cylindrical recess, said piston having a peripheral groove and a split ring seated in said groove and engaging the surface of said cylindrical recess in oil sealing relation.

14. In a connecting rod bearing lubrication system, a crankpin journal from which lubricant is fed to the surface thereof, said journal having a substantially plane end face, a connecting rod element having a bearing engaging the journal, a member rigid with the element having a cylindrical recess at an end thereof, an annular piston slidably engaged in said cylindrical recess in oil sealing relation, said piston having an end face engaged in sealing relationship with the end face of said journal, said piston being pressed into said end face sealing engagement by lubricant pressure resulting from end leakage of lubricant from the bearing into said cylindrical recess, and means to secure the piston and rod member from relative rotation.

15. In a connecting rod bearing lubrication system, a crankpin journal from which lubricant is fed to the surface thereof, said journal having a substantially plane end face, a connecting rod element having a bearing engaging the journal, a member rigid with the element having a cylindrical recess at an end thereof, and an annular piston slidably engaged in said cylindrical recess in oil sealing relation, said piston having an end face engaged in sealing relationship with the end face of said journal, said piston being pressed into said end face sealing engagement by lubricant pressure resulting from end leakage of lubricant from the bearing into said cylindrical recess, said rod member having auxiliary rods borne therein and having oil feed passages leading from said cylindrical recess to the several auxiliary rod bearings.

16. In a connecting rod bearing lubrication system, a crankpin journal from which lubricant is fed to the surface thereof, said journal having a substantially plane end face, a connecting rod element having a bearing engaging the journal, a member rigid with the element having a cylindrical recess at an end thereof, an annular piston slidably engaged in said cylindrical recess in oil sealing relation, said piston having an end face engaged in sealing relationship with the end face of said journal, said piston being pressed into said end face sealing engagement by lubricant pressure resulting from end leakage of lubricant from the bearing into said cylindrical recess, and a light spring between the rod member and piston to resiliently enforce engagement of the piston end face with the journal plane face.

17. In a master rod having a bearing bore and having a plurality of knuckle pins spaced around said bore, a bearing shell fitted to the rod bore having teeth at one end of the bearing accessible at an end face of the rod, and an annular member overlying an end face of the rod having a toothed portion engaging said bearing teeth and having outer portions engaging said knuckle pins, said member including an annular cavity to receive lubricant leaking from the bearing end and comprising conduits between said cavity and the knuckle pins.

18. In a master rod having a plurality of knuckle pins and including a bearing bore, in combination, a master rod bearing fitted to the bore and having its end projecting beyond an end face of the rod, said bearing end having serrations therein, and a member overlying the end face of the rod having serrations engaged with the bearing serrations to lock the bearing against rotation, having arms engaged with the knuckle pins to prevent the member turning with respect to the rod, and having passages therein to conduct lubricant leaking from the bearing end to said knuckle pins.

HENRY C. HILL.